United States Patent [19]

Ogawa

[11] Patent Number: 5,894,089
[45] Date of Patent: Apr. 13, 1999

[54] METHOD AND DEVICE FOR DETECTING A LIQUID LEVEL IN A CONTAINER

[75] Inventor: Yuji Ogawa, Tokyo, Japan

[73] Assignee: Organo Corporation, Tokyo, Japan

[21] Appl. No.: 08/837,227

[22] Filed: Apr. 10, 1997

[30] Foreign Application Priority Data

| Apr. 10, 1996 | [JP] | Japan | 8-113278 |
| Sep. 2, 1996 | [JP] | Japan | 8-250993 |

[51] Int. Cl.⁶ ................................................ G01F 23/22
[52] U.S. Cl. ........................... 73/295; 374/54; 116/227
[58] Field of Search ............................. 73/295; 374/54, 374/150; 116/216, 227

[56] References Cited

U.S. PATENT DOCUMENTS

| 3,696,675 | 10/1972 | Gilmour | 73/295 |
| 4,358,955 | 11/1982 | Rait | 73/295 |
| 5,099,688 | 3/1992 | de Mars | 73/295 |
| 5,304,003 | 4/1994 | Winninger | 374/150 |
| 5,323,652 | 6/1994 | Parker | 73/295 |
| 5,385,044 | 1/1995 | Thomas et al. | 73/295 |
| 5,707,590 | 1/1998 | Thomas et al. | 116/216 |

FOREIGN PATENT DOCUMENTS

| 0132233 | 1/1985 | European Pat. Off. | 73/295 |
| 3345593 | 4/1985 | Germany | 73/295 |
| 62-88923 | 4/1987 | Japan . | |

*Primary Examiner*—Diego Gutierrez
*Attorney, Agent, or Firm*—Helfgott & Karas, P.C.

[57] ABSTRACT

A liquid level indicator has a transparent vessel for retaining hot water therein and a thermo-sensitive tape (thermo-tape) attached at a side wall of the vessel with the sensing side of the thermo-tape facing the side wall of the vessel. The thermo-tape first exhibits black, then turns white after the hot water is poured into the vessel. When the thermo-tape is pressed against a partially filled liquid container, the thermo-tape turns black at one side of a boundary and turns white at the other side of the boundary that defines the liquid/gas interface in the container. This occurs because the liquid in the container cools the thermo-tape more rapidly than the gas in the container does. The boundary is observed through the walls of the transparent vessel and the hot water to detect the liquid level within the container.

4 Claims, 4 Drawing Sheets

FIG. IA
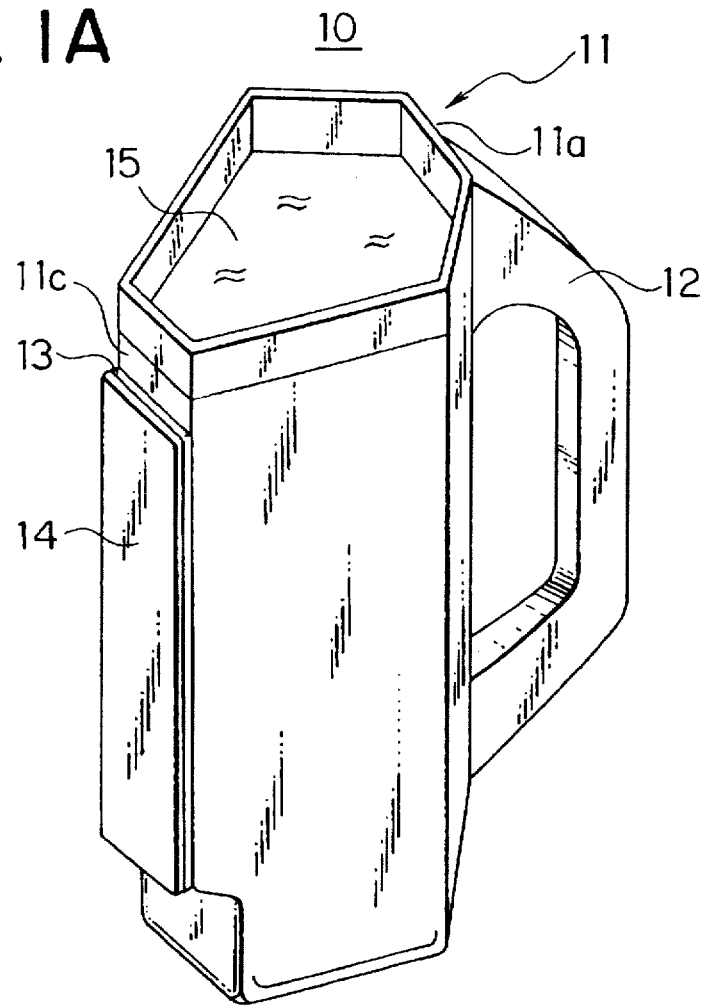
FIG. IB
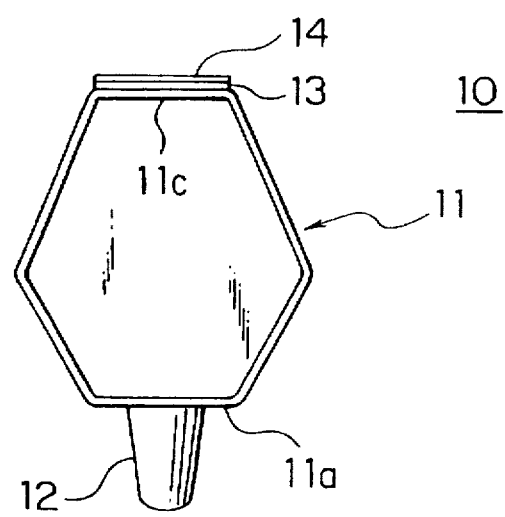

5,894,089

1

METHOD AND DEVICE FOR DETECTING A LIQUID LEVEL IN A CONTAINER

BACKGROUND OF THE INVENTION (a) Field of the Invention

The present invention relates to a method and device for detecting a liquid level in a container and, more particularly, to a liquid level indicator and a method for detecting a liquid level within an opaque container.

(b) Description of the Related Art

Liquid containers made of opaque materials such as a metal are widely used for retaining therein a liquid. These containers do not explicitly show the amount of the liquid remainder within the container for the user. The amount of the liquid remainder within the container can be generally detected by simply lifting the liquid container to estimate the weight thereof or by shaking the container together with the liquid for estimation, if the container is light in weight as is the case of a spray can or juice can. If the liquid container cannot be easily lifted, however, as is the case of a heavy container, a transparent level gauge or sight glass is generally used for detecting the liquid level within the container.

Recently, vending machines are increasingly used wherein a concentrate of a soft drink and the like is diluted with water and sold to a customer at the request thereof. A liquid container retaining therein a concentrate soft drink is stocked in the vending machines for each of the soft drinks. The stock container is replaced by a new container filled with the concentrate soft drink after the stock container is found empty. The replaced container is then cleaned, disinfected, again filled with the concentrate, sealed with a pressured gas and delivered to another vending machine as a new stock container.

It is generally difficult to lift or shake the stock container located within the vending machine to estimate the amount of the liquid remainder within the container due to a relatively large weight of the container and a narrow space inside the vending machine. A transparent level gauge, if installed on the stock container, raises the fabrication cost thereof and complicates the outer shape of the container to thereby hinder the washing and disinfection operation. A sight glass for the container also complicates a gas-seal mechanism for the container to thereby raise the fabrication cost of the container.

In short, a transparent gauge or sight glass for each of the containers is not practical for the liquid container in the vending machine because of the added fabrication cost therefor.

Another method may be considered for detecting the liquid remainder by attaching a thermo-sensitive color tape (thermo-tape), which is affected by a temperature thereof to change the color thereon, to the outer wall of the container at a suitable height or by printing a color mark onto the outer wall of the container with a thermo-sensitive color ink (thermo-ink) having a similar temperature characteristic. In this method, the thermo-tape or thermo-ink (simply referred to as thermo-tape hereinafter) is first heated (or cooled) to rise (or fall) locally in temperature above (or below) the ambient temperature and then observed to change its color while it is being naturally cooled or warmed toward the ambient temperature.

During the natural fall (rise) in the temperature of the thermo-tape, the lower portion of the thermo-tape facing the liquid inside the container falls (rises) slowly to the ambient temperature whereas the upper portion of the thermo-tape

2 facing the gas inside the container falls (rises) rapidly. Accordingly, the thermo-tape exhibits different colors at an instant during falling (rising) from the initial temperature to the ambient temperature. Thus, the liquid level within the container is estimated by detecting the boundary between the different colors. This method takes advantage of the difference in the thermal conductivity or thermal resistivity between the liquid and gas.

In the method using the thermal conductivity for detecting the liquid level as described above, cooling for the thermo-tape below the ambient temperature may be implemented by blowing cooled air, which is not practical however, because of the difficulty or high cost in implementing the device for cooling the air. When a refrigerator is used for cooling the thermo-tape instead, the thermo-tape must be detached and attached, which results in the reduction of the adhesiveness to render the thermo-tape useless.

Examples of the methods for heating the thermo-tape above the ambient temperature include blowing heated air, pressing the thermo-tape by using an external heater such as an iron, embedding a heater within the thermo-tape, touching the thermo-tape by hand etc., which methods are more practical than the method for blowing cooled air or cooling the thermo-tape.

The methods for heating the thermo-tape as described above, however, involve respective drawbacks therein. The method using heating by hand only provides a limited temperature rise which scarcely allows sufficient discrimination of temperatures by observation of the colors. The method using heated air dose not allow uniform heating of the thermo-tape. The method of using an iron or installing an electric heater within the thermo-tape requires a temperature control device for attaining an accurate and uniform temperature by, for example, fitting the thermo-tape with a temperature sensor, thereby raising the fabrication cost for the liquid container. The electric heater also requires an outlet for a power source in the vicinity of the liquid container, or otherwise, requires long and troublesome electric leads which may hinder the handling of the container or other work.

The external electric heater such as an iron, if used, covers the thermo-tape during the heating, which requires removing the iron from the surface of the thermo-tape during observation of the color thereon. In this case, removal of the iron results in a rapid natural cooling of the thermo-tape, which may hinder the effective detection of the color change of the thermo-tape by the operator. Further, possible overheating may damage the nature of the thermo-tape, which requires a thermo-fuse to further raise the fabrication cost of the container.

SUMMARY OF THE INVENTION

In view of the foregoing, it is an object of the present invention to provide a method and device for detecting a liquid level within an opaque container with a relatively low cost and with easy handling.

In accordance with the present invention, there is provided a liquid level indicator comprising a vessel, having at least first and second transparent wall portions, for receiving a hot or cooled liquid, and a thermo-sensitive tape supported by the vessel at the second transparent wall portion, the thermo-sensitive tape having a first surface exhibiting a color based on the temperature of the thermo-sensitive tape, the first side of the thermo-sensitive tape being observable through the first and second transparent wall portions.

In accordance with the present invention, there is also provided a method for detecting a liquid level within a container comprising the steps of supporting a thermo-sensitive tape at a first transparent wall portion of a vessel, the thermo-sensitive tape having a first side exhibiting a color based on the temperature of the thermo-sensitive tape, pouring into the vessel a transparent liquid having a temperature different from the temperature of the container, touching the container with the thermo-sensitive tape attached on the first transparent wall portion, detecting the temperature of the container by observing the different colors of the thermo-sensitive tape through the first transparent wall portion and a second transparent wall portion of the vessel.

The liquid level indicator and method according to the present invention provides several advantages in that a single device according to the present invention or implementing the method according to the present invention can be used for detecting liquid levels within a plurality of containers. The the simple structure of the device enables a lower fabrication cost; a stable temperature is obtained by the liquid in the vessel without overheating the thermo-sensitive tape, and the device allows easy observation for detecting the liquid level and easy treatment or handling of the device before and after the detection.

Examples for the vessel include a cup having a fixed shape and made of a hard plastic material or polyester, and a flexible bag or tube exhibiting different shapes depending on the presence or absence of the liquid. The vessel is preferably made of a transparent material. It is sufficient, however, that the vessel is partially transparent provided that the transparent wall portion supporting the thermo-tape can be seen through the other transparent wall portion of the vessel and the transparent liquid in the vessel.

If the vessel has a fixed shape, it is preferable that the vessel be a hexagon-cylindrical cup, one side wall of which has a handle or grip thereon and an opposite side wall of which is attached to by the thermo-sensitive tape.

If the vessel has a flexible shape, it is preferable that the vessel be provided with a grip or a stand or the vessel be covered by a heat-insulating material, thereby reducing the amount of heat conducted to the hand of the operator for safety and easy handling.

The above and other objects, features and advantages of the present invention will be more apparent from the following description, referring to the accompanying drawings.

BRIEF DESCRIPTION OF THE DRAWINGS

FIG. 1A is a perspective view of a liquid level indicator according to a first embodiment of the present invention;

Fig. 1B is a top plan view of the liquid level indicator of FIG. 1A;

DETAILED DESCRIPTION OF THE PREFERRED EMBODIMENTS

Figure 2:
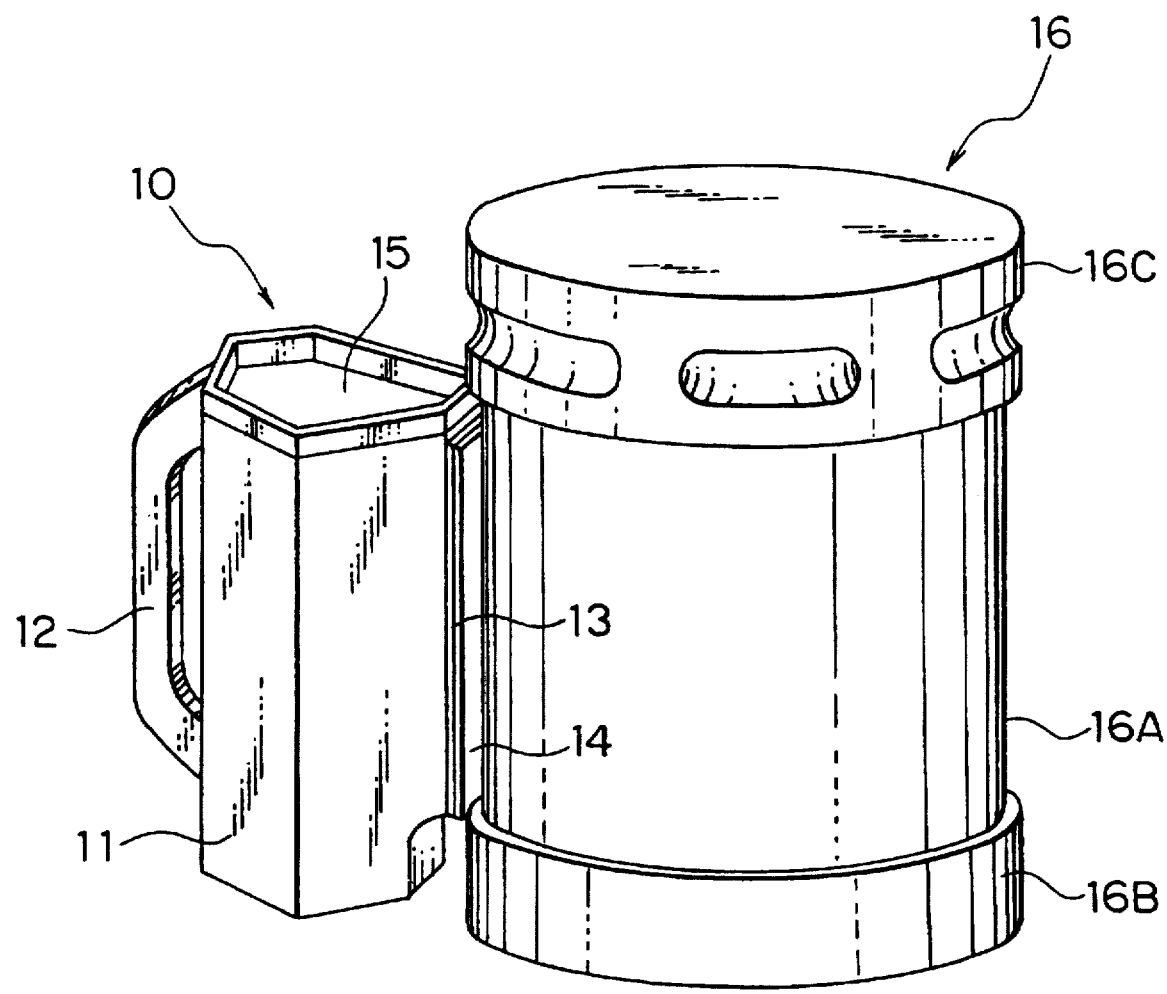
FIG. 2 is a perspective view of a combination of a liquid container and the liquid level indicator of FIG. 1A for showing the operation of the liquid level indicator.

FIGS. 1A and 1B show a liquid level indicator according to a first embodiment of the present invention. The liquid level indicator 10 comprises a transparent vessel 11 of a hollow hexagon-cylinder having a closed bottom and a top opening for receiving hot water 15 therethrough. The transparent vessel 11 has six side walls or surfaces each having a 300-millimeter height approximately and a width of several dozen-millimeter, for example. One of the side surfaces, i.e., a first side surface 11a of the vessel 11, has a handle 12 thereon and a second side surface 11c of the vessel 11 opposed to the first side surface 11a is attached to a transparent sheet 13 having a 200-millimeter length approximately at a position such that the bottom of the transparent sheet 13 is about 75 millimeters apart from the bottom of the vessel 11. The transparent sheet 13 is made of an elastic silicone rubber and has a thermal resistance higher than that of air and lower than that of a metal, earthenware and the liquid inside the vessel 11.

Onto the surface of the silicone rubber 13 is bonded a thermo-sensitive tape (thermo-tape) 14 having the same configuration and size as the transparent sheet 13. The thermo-tape 14 is made of a liquid-crystal compound, and exhibits, for example, a color of black at a temperature of the thermo-tape below 60° C. and exhibits a color of white at a temperature equal to or above 60° C. in this embodiment. The thermo-tape 14 is attached to the transparent sheet 13 by bonding such that the sensing surface or first surface of the thermo-tape 14 is facing the second side surface 11c of the vessel 11 with an intervention of the transparent sheet 13.

Before use of the liquid level indicator 10 of the present embodiment, hot water 15 constituting a heat source for the level indicator and having a temperature above about 95° C. is poured into the transparent vessel 11. The heat from the heat source is conveyed to the thermo-tape 14 through the transparent sheet 13 to raise the temperature of the thermo-tape 14 so that the color of the whole first surface of the thermo-tape 14 changes from black to white. In this state, as shown in FIG. 2, the transparent vessel 11 is pressed or thrust against a liquid container 16 such that the thermo-tape 14 is pressed against the wall of the liquid container 16. The liquid container 16 retains therein a concentrate or stock solution of soft drink maintained at ambient temperature. The transparent sheet 13 made of silicone rubber provides a sufficient contact area for heat conduction between the wall of the container 16 and the thermo-tape 14.

After the thermo-tape 14 is pressed against the side wall of the container 16, there is a time when the thermo-tape 14 exhibits different colors on the first surface between the upper portion and the lower portion of the thermo-tape 14. Specifically, the upper portion of the thermo-tape 14 contacting the upper side wall of the container 16, which is in contact with the gas within the container 16, continues to exhibit white color as before, whereas the lower portion of the thermo-tape 14 contacting the lower side wall of the container 16, which is in contact with the concentrate soft drink, turns to exhibit black color. This is because the heat conducted from the gas is small due to a small thermal conductivity and a small thermal capacity of the gas, which results in a smaller temperature drop of the upper portion of the thermo-tape 14 whereas the heat conducted from the soft drink concentrate is large due to a large thermal conductivity and a large thermal capacity of the soft drink, concentrate which results in a larger temperature fall of the lower portion of the thermo-tape 14.

The thermo-tape 14 senses the different temperatures by exhibiting different colors between the upper portion, and the lower portion separated by a boundary corresponding to the liquid level within the container 16. Since the first surface of the thermo-tape 14 is attached to the transparent sheet 13, the boundary of the different colors can be observed from outside the vessel 11 by the operator through another side surface of the vessel 11 adjacent to the first side surface 11a, through the hot water 15, second side surface 11c and the transparent sheet 13, thereby allowing detection of the level of the remainder of the soft drink concentrate.

In the first embodiment of FIG. 1, the configuration of the hexagon-cylinder for the vessel 11 allows the operator to observe the colors on the thermo-tape while handling the vessel 11 by hand. If the operator is dextral or right-handed, the operator can use his right hand for handling the vessel 11 while observing the thermo-tape 14 through a third side surface, which is located adjacent to the first side surface 11a of the vessel 11 in the clockwise direction as viewed from above the vessel 11. If the operator is left-handed, the operator can use his left hand while observing the thermo-tape 14 through a fourth side surface, which is located adjacent to the first side surface 11a in the counter-clockwise direction. This feature is conveniently obtained by the refraction of the hot water in the vessel 11.

The level indicator 10 of the present embodiment is particularly suited for measurement of the liquid level of a container used in a vending machine for stocking a concentrate soft drink. The stock container, as shown in FIG. 2, is generally formed of a body 16A, a base 16B for supporting the body 16A on a floor of the vending machine and a top 16C for providing a top grip for the operator. The vertical position of the thermo-tape 14 is determined such that the bottom of the thermo-tape 14 is aligned with the lower boundary of the container 16 between the base 16B and the body 16A and such that the top of the thermo-tape 14 is aligned with the upper boundary of the container 16 between the body 16A and the top 16C. This configuration allows a weak operator first to place the vessel on the floor of the vending machine and then simply shift the vessel toward the container 16 in the horizontal direction on the floor without lifting the vessel 11. If silicone oil is coated onto the thermo-tape 14, the silicone oil gives a large thermal conductivity to the thermo-tape 14 for attaining a rapid measurement.

Figure 3:
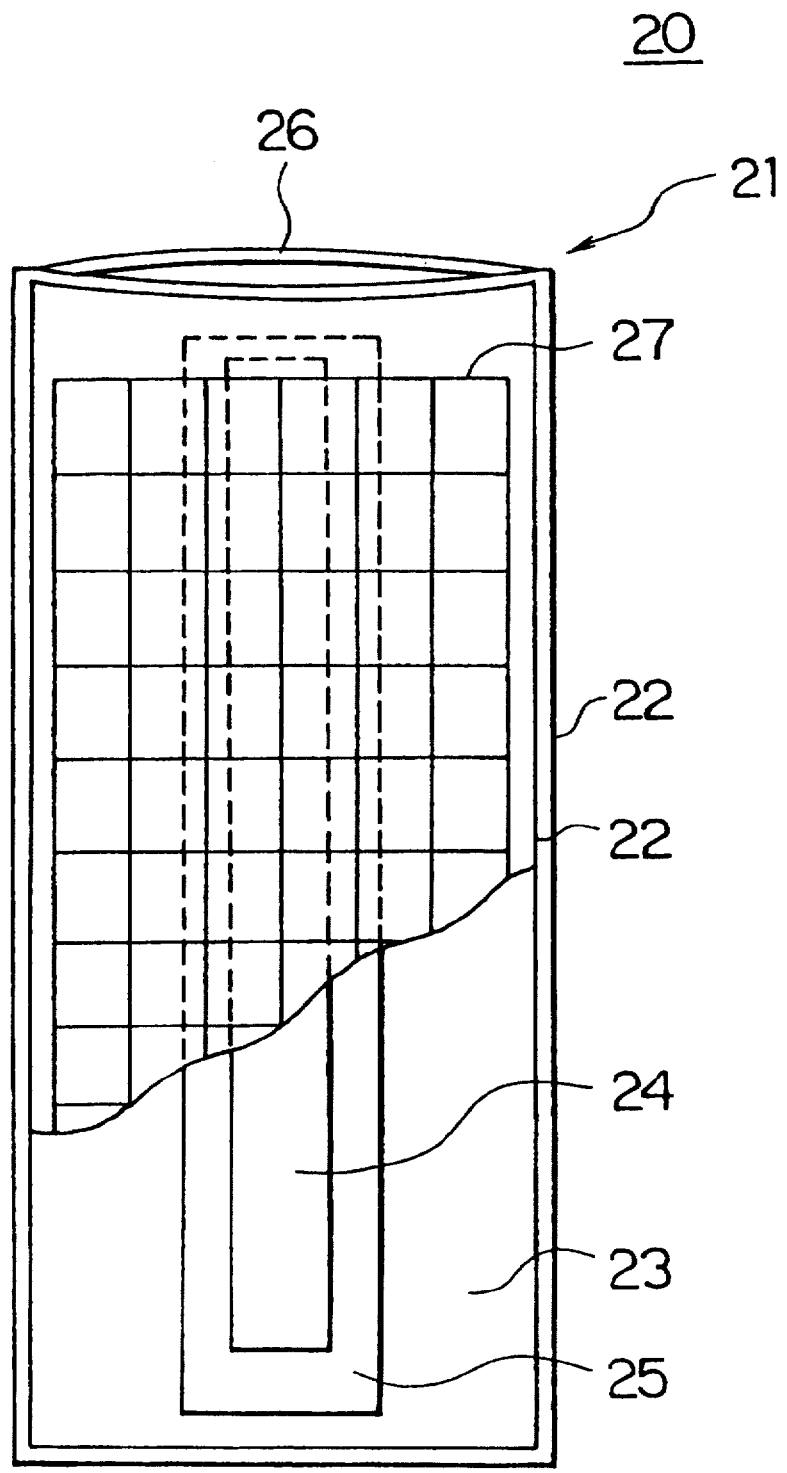
FIG. 3 is an elevational view of a front side of a liquid level indicator according to a second embodiment of the present invention.

FIG. 3 shows a front side of a liquid level indicator 20 according to a second embodiment of the present invention, wherein the front side of the liquid level indicator 20 is partly broken away to show the rear side 23 thereof as well as a thermo-tape 24 for the sake of understanding. The liquid level indicator 20 has a plat, planiform or thin vessel 21 made of double polypropylene films 22 and the thermo-tape 14 is mounted on the rear side thereof.

The vessel 21 has a top inlet 26 for pouring hot water therethrough and a clamp, not shown in the figure, for clamping the top inlet 26 for sealing after the pouring. The vessel 21 may have a reinforcement for the periphery of the top inlet 26 so as to improve the seal function. The thermo-tape 24 is bonded beforehand onto a base sheet 25 having a scale thereon, and adhered to the vessel 21 such that the first side of the thermo-tape 24 for sensing the temperature thereof by color is in contact with the surface of the vessel 21. The thickness of each polypropylene film 22 is 0.1 mm, for example. If the thickness of the polypropylene film 22 is extremely smaller than the specified thickness, the color of the thermo-tape 24 or the temperature difference is not effectively observed. The thermo-tape 24 may be replaced by a thermo-ink printed on the base sheet 25.

The vessel 21 has a lattice separator 27 on the front side thereof (or on both sides thereof except for the location of the thermo-tape 24) interposed between the double polypropylene films 22. The lattice separator 27 may be made of polypropylene sandwiched between the double polypropylene films 22 constituting the vessel 21. The lattice separator 27 provides protection of hand and fingers against heat and mechanical strength for the vessel 21, as well as prevention of dew condensation which may otherwise occur between the double polypropylene films 22 due to the temperature change by the hot water. The liquid level indicator 20 of the present embodiment can be used in a manner similar to use of the first embodiment, and provides an advantage of excellent portableness due to the light weight and the thin shape, and is suited for use as a disposable indicator.

Figure 4:
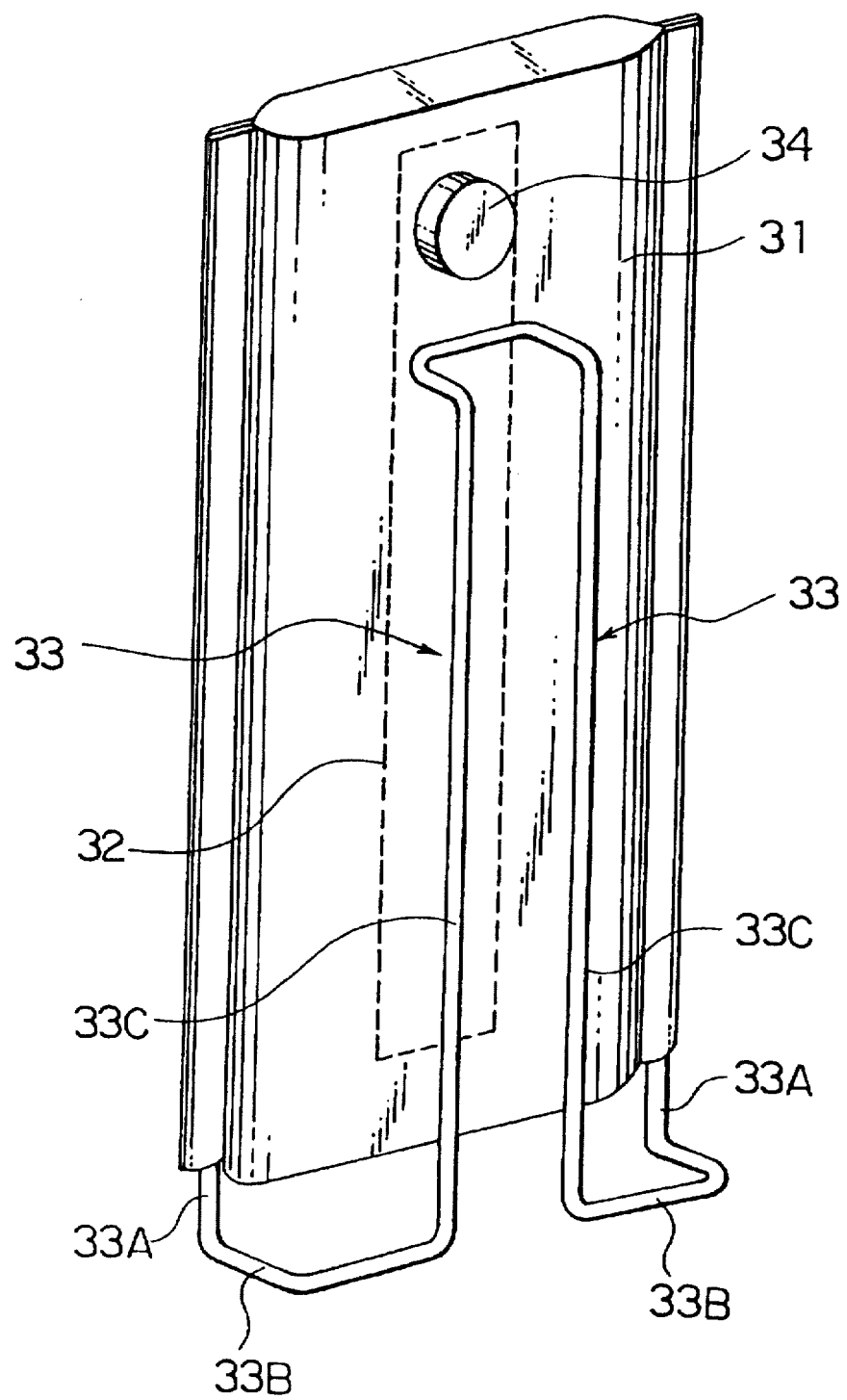
FIG. 4 is a perspective view of a liquid level indicator according to a third embodiment of the present invention.

FIG. 4 shows a liquid level indicator 30 according to a third embodiment of the present invention. The liquid level indicator 30 comprises a vessel 31 made of transparent and soft polyvinyl chloride. The vessel 31 is substantially formed of an elongate rectangular prism extending in the vertical direction and having a relatively small thickness. The vessel 31 is provided with a thermo-tape 32 shown by a dotted line and bonded to the rear side of the vessel 31 for allowing observation of the color of the thermo-tape 32 through the front side of the vessel 31. The vessel 31 is provided with an inlet 34 for hot water at the front side thereof in the vicinity of the top of the vessel 31. The inlet 34 can be sealed with a cap.

The level indicator 30 also has a pair of elongate detachable stands 33, each having a U-shape, for supporting the vessel 31 in an up-right posture. Each U-shape stand 33 has a first leg 33A slidably received for fixing within a sheath formed at each lateral side of the vessel 31, a bottom bar 33B extending horizontally, first perpendicular to the front side of the vessel 31 and then parallel to the front side, and a second leg 33C extending vertically and parallel to the front side of the vessel 31 for providing a grip by hand. The top ends of the second legs 33C of both U-shape stands 33 are coupled together for providing mechanical strength for the grip 33C. The liquid level indicator 30 thus constructed can stand in the upright posture as shown in the figure, and can be carried by using the grip and laid down with the rear side of the vessel 31 on the floor.

Prior to operation of the liquid level indicator 30, hot water is poured into the vessel 31 while it is laid down on the floor, followed by sealing the inlet 34 with the cap. The thermo-tape 32 on the back side is then pressed against a liquid container for measurement of the liquid level similarly to the first and second embodiments. The liquid level indicator 30 of the present embodiment, which has the stands 33 for providing a grip as described above, provides easy handling as well as safety to an operator during operation for pouring the hot water and pressing the vessel 31 against the container. The soft polyvinyl chloride of the vessel 31 presents an excellent contact for heat conduction between the thermo-tape 32 and the outer wall of the container during pressing the thermo-tape 32 to the container.

In the liquid level indicators of the embodiments as described above, there is an advantage in that the hot water used as a heat source provides a stable temperature on the order of 95° C., for example, which does not rise above 100° C. Further, there is another advantage in that the hot water can be easily obtained within a vending machine itself or in a store installing the vending machine. Further, it is sufficient to pour hot water into the vessel prior to a measurement and the hot water can be easily disposed after the measurement without any contamination of the natural environment. The provides easy handling both prior to and after the measurement.

The liquid level indicator according to the present invention is not limited to one used for the container retained in a vending machine, and can be used for a variety of containers. The liquid level indicator can be used for measurement of a liquid level in any opaque containers, such as a beer container or liquefied gas bomb, retaining a liquid therein.

Although the present invention is described with reference to preferred embodiments thereof, the present invention is not limited thereto and various modifications or alterations can be easily made from the embodiments by those skilled in the art without departing from the scope of the present invention.

What is claimed is:

1. An indicator for detecting a level of a first liquid in a container, said indicator comprising:

a vessel having at least first and second transparent portions, in use said vessel being capable of holding a second liquid that is one of warmer and cooler than said first liquid in said container said vessel being a bag having a flexible shape;

a thermo-sensitive tape having a first surface attached to said second transparent portion of said vessel, said first surface of said tape being visible through said first and second transparent portions of said vessel, and in use visible through said first and second portions and through said second liquid in said vessel, said first surface exhibiting a color that depends on a temperature of said thermo-sensitive tape, in use, pressing a second surface of said tape against said container providing a visible color change in said first surface of said tape corresponding to a level of said first liquid in said container.

2. A liquid level indicator as defined in claim 1 further comprising a stand for supporting said bag.

3. A liquid level indicator as defined in claim 2 wherein said stand also functions as a grip.

4. A method for detecting a liquid level within a container comprising the steps:

attaching a first side of a thermo-sensitive tape to a first transparent wall portion of a vessel, said thermo-sensitive tape first side exhibiting a color based on the temperature of said thermo-sensitive tape, pouring into the vessel a liquid having a temperature different from the temperature of the container, pressing said thermo-sensitive tape against a wall portion of the container, detecting a temperature difference of the thermo-sensitive tape by observing different colors of said thermo-sensitive tape through said first transparent wall portion and a second transparent wall portion of said vessel, and detecting the liquid level within the container based on said temperature difference.

* * * * *